United States Patent [19]

Gordon

[11] Patent Number: 4,748,569
[45] Date of Patent: May 31, 1988

[54] HELICOPTER NAVIGATION AND LOCATION SYSTEM

[75] Inventor: Alastair C. Gordon, Dorking, United Kingdom

[73] Assignee: Bristow Helicopters Limited, United Kingdom

[21] Appl. No.: 756,496

[22] PCT Filed: Oct. 17, 1984

[86] PCT No.: PCT/GB84/00350
  § 371 Date: Aug. 5, 1985
  § 102(e) Date: Aug. 5, 1985

[87] PCT Pub. No.: WO85/01809
  PCT Pub. Date: Apr. 25, 1985

[30] Foreign Application Priority Data
  Oct. 17, 1983 [GB] United Kingdom ............... 8327760

[51] Int. Cl.$^4$ .................. G05D 1/12; G06F 15/50
[52] U.S. Cl. ..................... 364/462; 244/17.13; 73/178 H
[58] Field of Search .......... 364/434, 462, 428, 429, 364/430, 443; 342/53; 244/17.11, 17.13, 17.15, 17.17; 73/178 H

[56] References Cited

U.S. PATENT DOCUMENTS

| | | | |
|---|---|---|---|
| 2,941,753 | 6/1960 | Ripper | 244/77 |
| 3,048,836 | 8/1962 | Guarino et al. | 343/7 |
| 3,610,821 | 10/1971 | Narbaits-Jaureguy | 178/6.8 |
| 3,886,306 | 5/1975 | Fayard et al. | 244/17.11 |
| 3,934,250 | 1/1976 | Martin, Jr. | 342/53 |
| 3,992,707 | 11/1976 | Schmidtlein et al. | 342/53 |
| 4,029,271 | 6/1977 | Murphy et al. | 244/17.13 |
| 4,345,310 | 8/1982 | Gautier | 364/429 |
| 4,383,299 | 5/1983 | Fischer et al. | 364/434 |
| 4,551,804 | 11/1985 | Clark et al. | 364/434 |

FOREIGN PATENT DOCUMENTS 0076877 4/1983 European Pat. Off. .

Primary Examiner—Parshotam S. Lall
Assistant Examiner—Thomas G. Black
Attorney, Agent, or Firm—Kenyon & Kenyon

[57] ABSTRACT

The disclosure relates to a helicopter (5) having a flight path computer to provide signals for pilot or automatic flying in accordance with a predetermined flight path, a forward looking infra-red camera (6) for scanning ahead and to either side of the flight for an object such as a person in the sea, a screen display for the camera and a control to be operated when the helicopter overflies the person to cause the flight path computer to provide control signals to take the helicopter through a circuit down-wind of the person and then back into-wind at pre-selected heights and speed towards the location of the person and then to hover over the person.

26 Claims, 6 Drawing Sheets

TYPICAL FPC PILOTS CONTROLLER

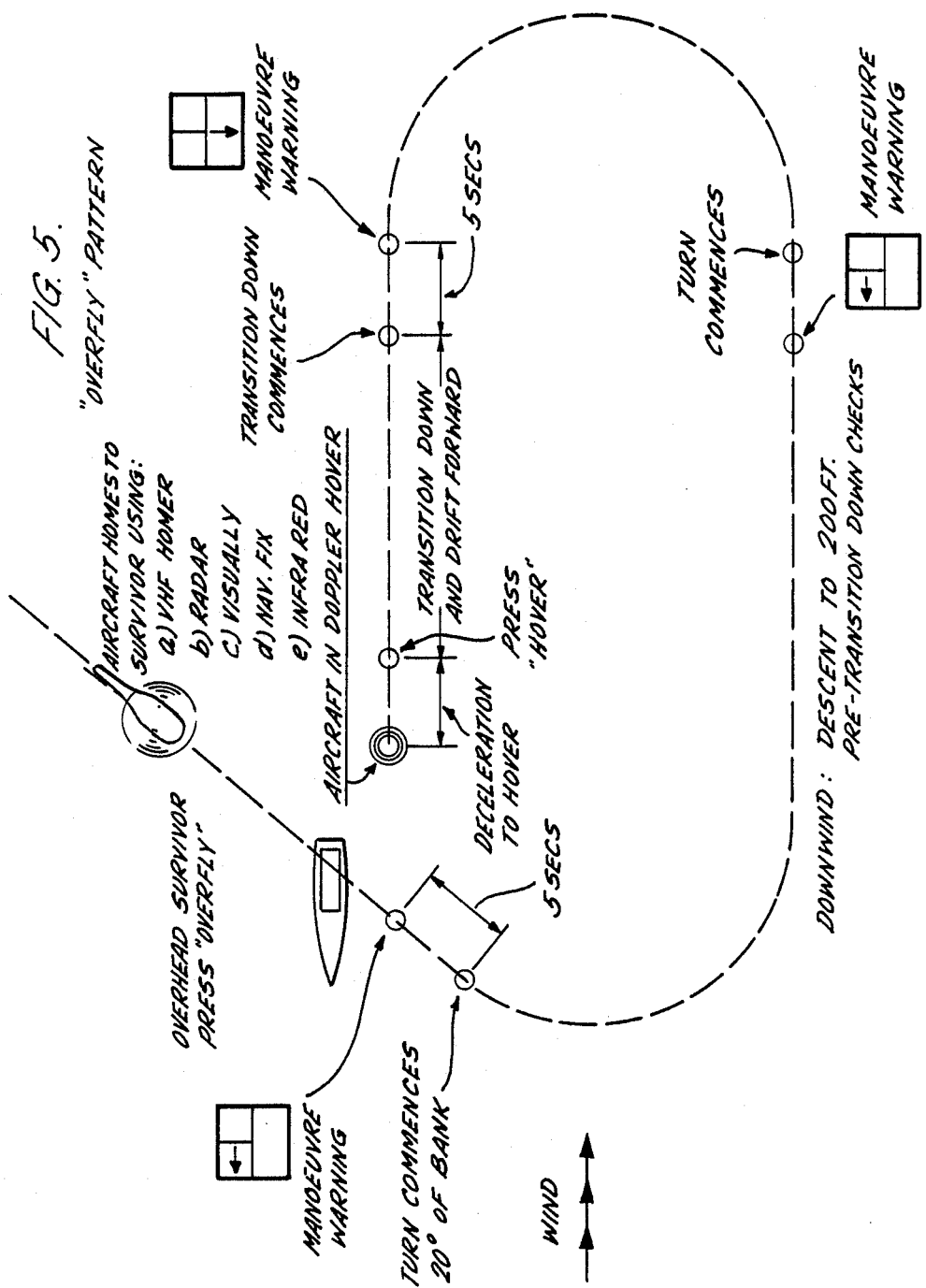
FIG. 5. "OVERFLY" PATTERN

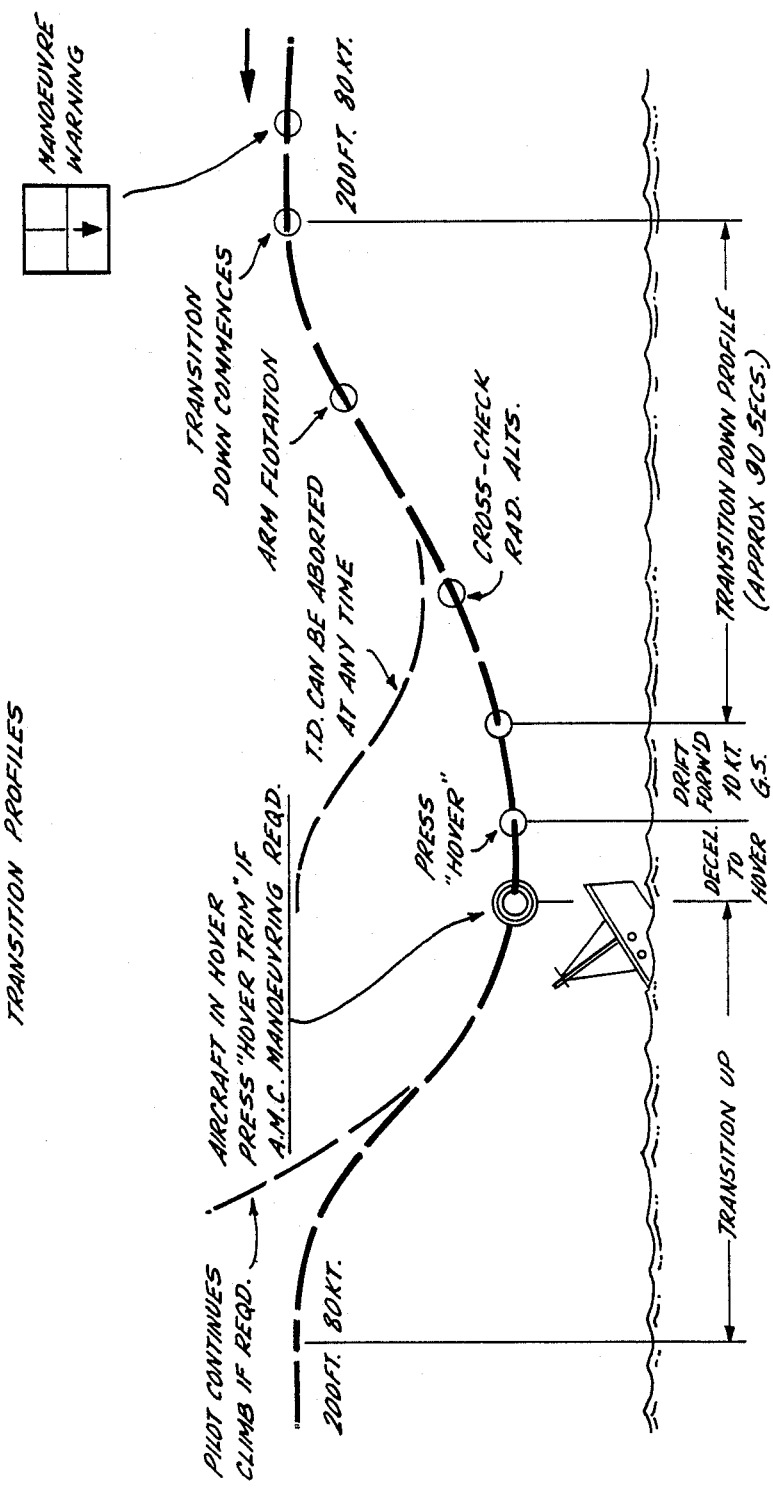

HELICOPTER NAVIGATION AND LOCATION SYSTEM

This invention relates to the provision of equipment on a helicopter for assisting the crew in the location of an object and the navigation and operation of the helicopter in relation to that object.

This invention provides in a helicopter, the provision in combination of a forward looking electro-magnetic radiation (including thermal) detector and having a screen display for providing an image of radiation sources/reflectors detected thereby, and flight director means having actuating means for operation when the helicopter is positioned overhead of a particular object located by the detector and flight path computer means to provide signals for automatic control or pilot guidance of the helicopter in a predetermined flight pattern to bring the helicopter down-wind of the object and then into-wind and at pre-selected heights and predetermined speed towards the location of the object without the need for an external visual reference.

The detector may be in the form of an infra-red camera conveniently arranged to provide a television-type display on a cathode ray screen which can be observed by a member of the helicopter crew, the camera scanning transversely across the line of the flight path. With the present day infra-red sensing equipment, a region of, say, about a quarter-mile on each side of the flight path might be scanned.

One particular use of the subject system is to assist the helicopter crew to effect a search for and rescue of a survivor in the sea, other uses and applications include, safe approaches to off-shore locations, accurate location of pipeline defects and safe approaches to inaccessible landing sites or landing sites not previously surveyed.

The detection of a survivor requires interpretation of the camera display. Thus manually operable means, e.g. push-button control, may be used for providing said signal indicating the position of the helicopter overhead a survivor.

The use of the infra-red camera obviates the necessity for direct visual location of the survivor and this is of particular advantage in facilitating rescue operations at night or in bad weather conditions.

Location of the position of the survivor or other object over which it is desired to position the helicopter may be achieved by means other than infra-red. For example, standard image television camera, radio homing beacon, a signal from which is detected and its bearing displayed by receiver equipment located within the helicopter or radar with the display receiver being located within the helicopter.

Heretofore, a major problem in rescuing a person at night or in bad weather conditions, has been the location of the survivor. In conditions of reduced visibility the helicopter, if permitted to fly at all, is forced to fly very low, with consequential dangers associated with that practice. Moreover when flying low, the chances of locating and hence rescuing a survivor in rough seas are greatly reduced.

As will be explained hereinafter, by appropriate integration of sensors and other equipment, it is possible for the helicopter to be flown along predetermined flight patterns and at pre-determined heights both before and after location of the survivor.

The sensor derived data is used either to provide signals to the pilot who can thus use these signals to enable him to fly the helicopter along the pre-determined flight patterns and at the pre-determined heights or to provide information to the helicopter Automatic Flight Control System (referred to hereinafter as AFCS) to enable fully coupled control of the flight path to be achieved. By appropriate use of suitable inputs to an onboard computer, there need be no requirement for the pilot to use external visual references. This marks a further significant advance in technique for search and rescue operations using a helicopter.

It is common practice in helicopters at the present time to make use of computer integrating sensor inputs. One such input would typically be a radio navigational position for determining the position of the helicopter. This may be used for providing the required positional information for use by the flight director equipment.

As previously indicated, after a survivor is located, it is required to bring the helicopter back around to a position down-wind of the survivor's location. The operation of the aforementioned manual or fully automated control can initiate the required computer-controlled operation to note the position of the helicopter and to compute the required manoeuvres. Height information may be obtained from a radio altimeter. Wind direction may be obtained, in the known way, from computer processing of sensor inputs. A Doppler radar may be employed to determine lateral and longitudinal ground speeds and to provide hover control signals and in conjunction with the computer to assess and allow for any drift to which the survivor is being subjected. It is thus possible, in the stages after location of a survivor to give the pilot or the helicopter "AFCS" the required information to fly the helicopter without the necessity for using external visual references. In particular, the helicopter can be flown in a safe, non-visual, orbit to bring the helicopter back to and at the required height over the position of the survivor even if he has drifted by reason of forces such as wind or tide. During the rescue stage of the operation, control of the helicopter may be effected in the known way but the use of the Doppler radar for hover control still obviates the necessity for the pilot to have an external visual reference.

A further major advantage of the use of the integrated sensor data input to the computer is that it permits provision of signals, before the survivor is located, indicating the required flight path of the helicopter for flying in a pre-determined search pattern, e.g. from a search start point. This search further may, for example, be a "creeping line" search pattern in which the helicopter flies to-and-fro along a series of parallel tracks spaced a pre-determined distance apart. Such search patterns are well known and can be provided as inputs to the flight path computer from an area navigation computer.

In addition, the flight path of the helicopter may be monitored to warn the pilot that either he or the "AFCS" is either failing to adhere to the predetermined flight pattern or is being given erroneous information and in either case to warn the pilot to take the necessary action to control the helicopter safely away from the controlled flight pattern, e.g. using the helicopter basic flying instruments.

For the present purposes, it is convenient to make use of the display screen of a forward-looking search radar, the signals indicating the required path for the search pattern being applied to the radar display to show the required search path superimposed on the radar display.

The following is a description of some specific embodiments of the invention reference being made to the accompanying drawings in which.

FIG. 5 is a diagram, not to scale, illustrating the flight pattern in over-flying from first finding a survivor to bring the helicopter back over the location where the survivor was detected, it being noted that for the purposes of the diagram it has been assumed that the flight path computer has been programmed to bring the helicopter to a position astern and to the left of the survivor; and FIG. 6 is a diagram illustrating altitude transitions during the final stages of the over-fly pattern of FIG. 5.

Figure 1:
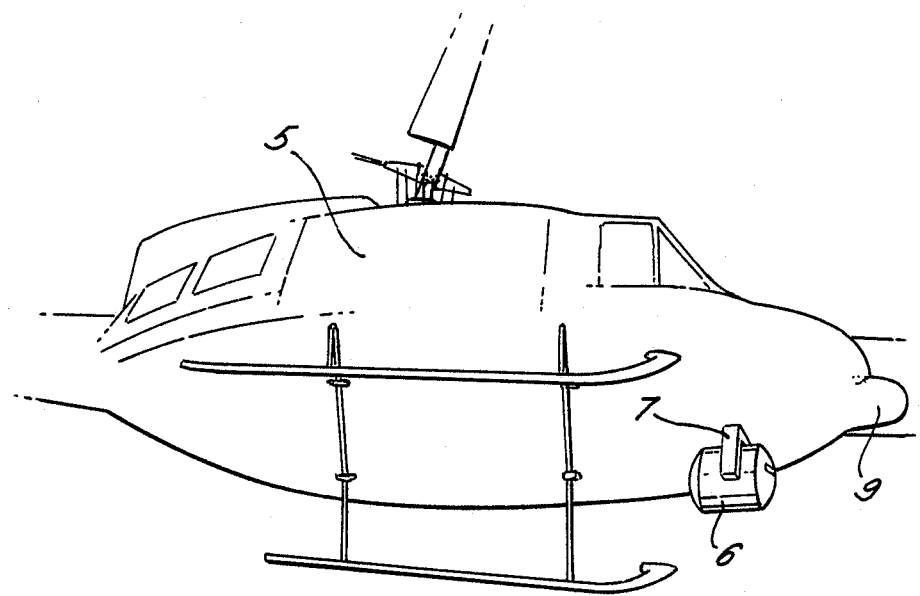
FIG. 1 is a perspective view of part of a helicopter looking from below and to one side of the helicopter.

Referring firstly to FIG. 1 of the drawings; there is shown a helicopter 5 fitted out with air/sea rescue equipment including a forward looking infra-red camera 6 slung in a bracket 7 on the underside of the helicopter and fitted with a scanner to scan the ground/sea in front of the helicopter as the helicopter moves forwardly along a pre-determined search path. The infrared camera is coupled to a display screen (such as the screen shown in FIG. 2) in the helicopter cabin. When a source of heat such as a body in the water comes within the field of vision of the camera, a corresponding image appears on the screen and, if identified by the crew as the object for which they are searching, the helicopter is then flown through a pre-determined flight path to bring it back into a hover position over the object as will be described in detail later.

Figure 2:
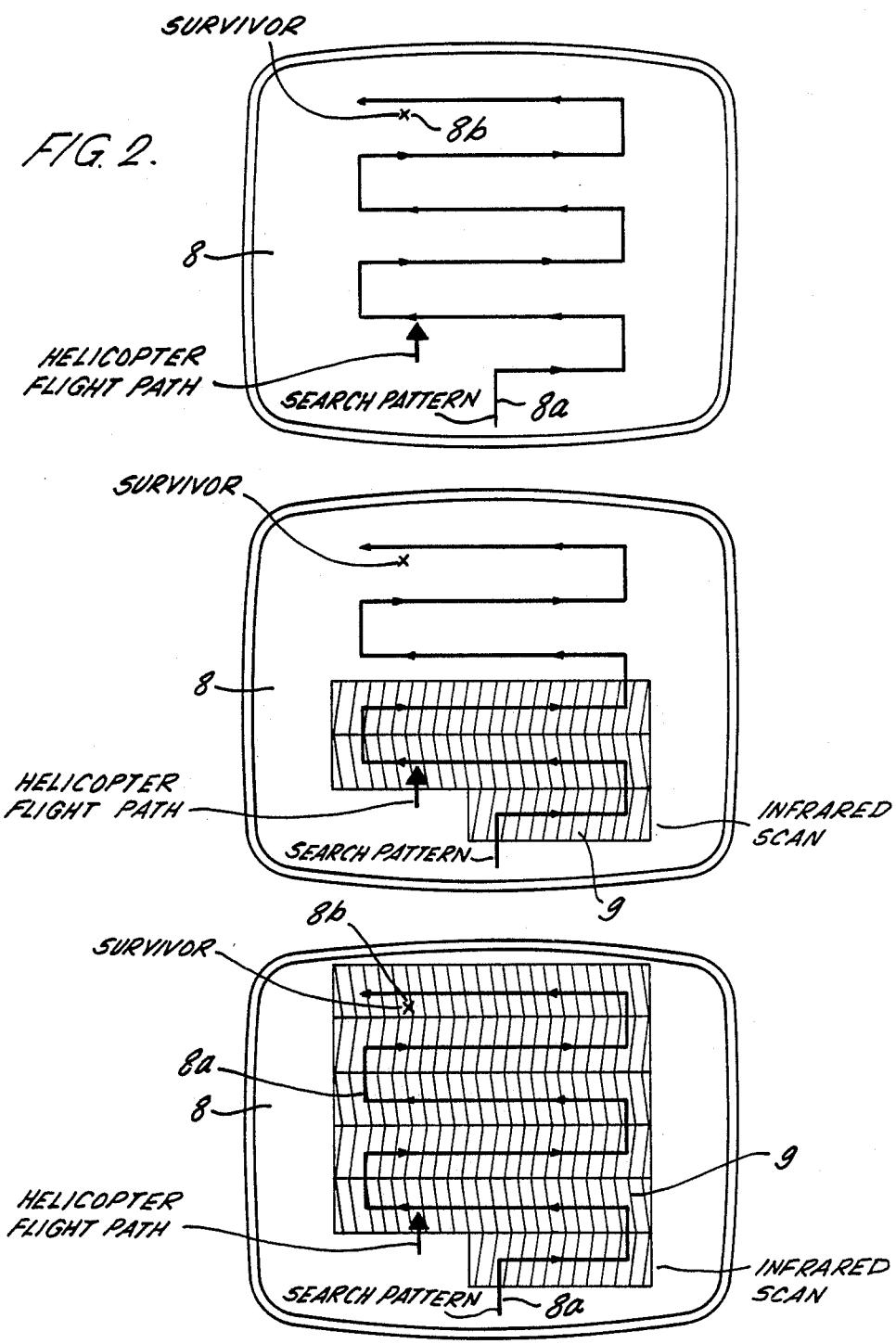
FIG. 2 shows a series of screen displays illustrating a search pattern using a forward looking search radar system.

FIG. 2 of the drawings shows the screen 8 of the helicopter radar system the transmitter/receiver for which is indicated at 9 on FIG. 1 on which a search path or pattern 8a is depicted over which the helicopter is flown to trace a survivor depicted at 8b on the screen. The helicopter has a digital micro-processor based automatic flight control system as described later which is pre-programmed to calculate the required zig-zag course to be flown by the helicopter towards the anticipated location of the survivor and to provide on a readout the necessary information for the pilot to fly the helicopter over the course. Alternatively the navigation system can be linked directly to an automatic pilot system for the helicopter to cause the helicopter to fly the search path automatically.

The second of the screens shown in FIG. 2 depicts the area of the infra-red scan as the helicopter flies along the search path and the third screen shows the search path covering the location 8b of the survivor.

Figure 3:
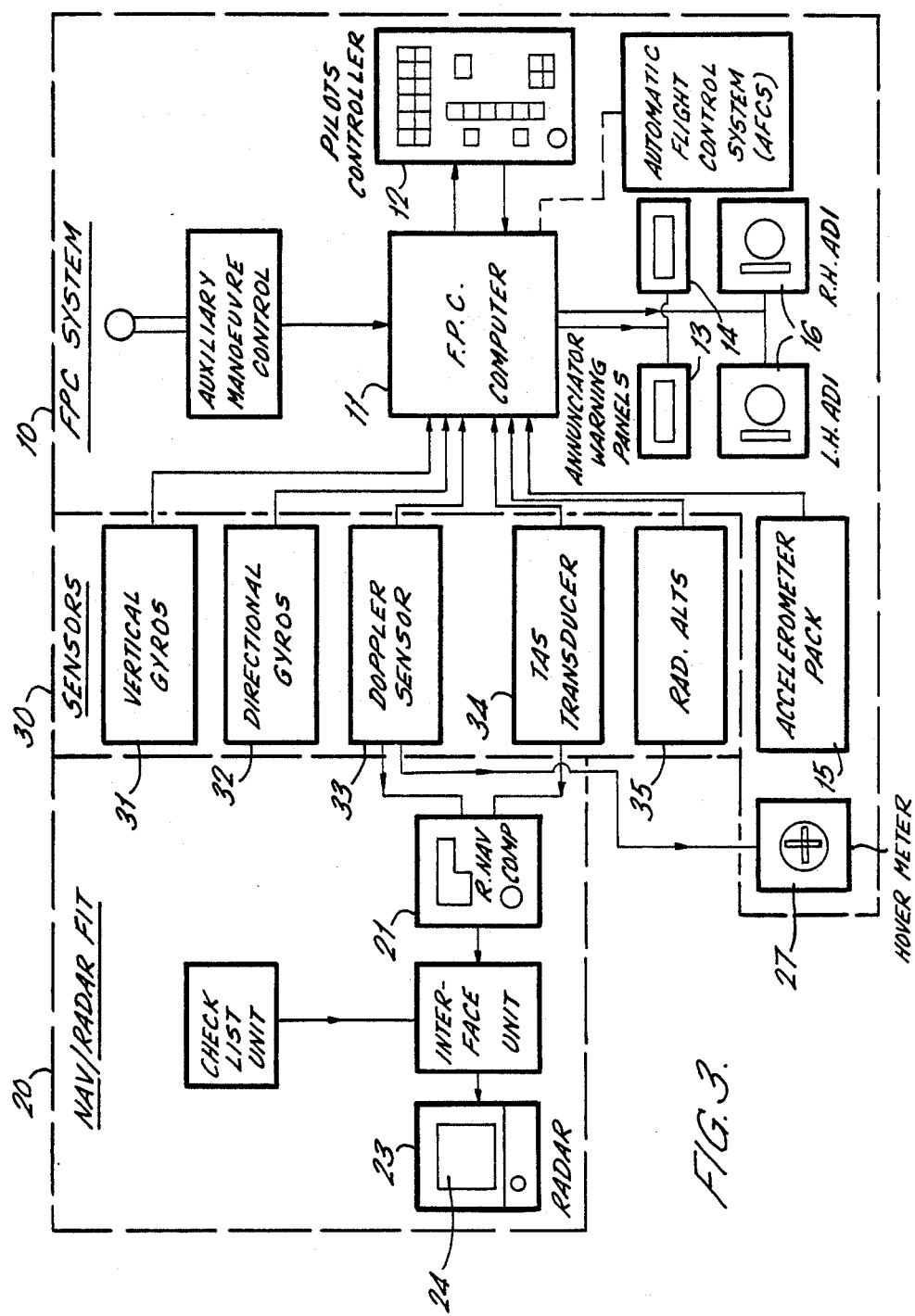
FIG. 3 shows schematically some of the equipment in the search and rescue helicopter.
Figure 4:
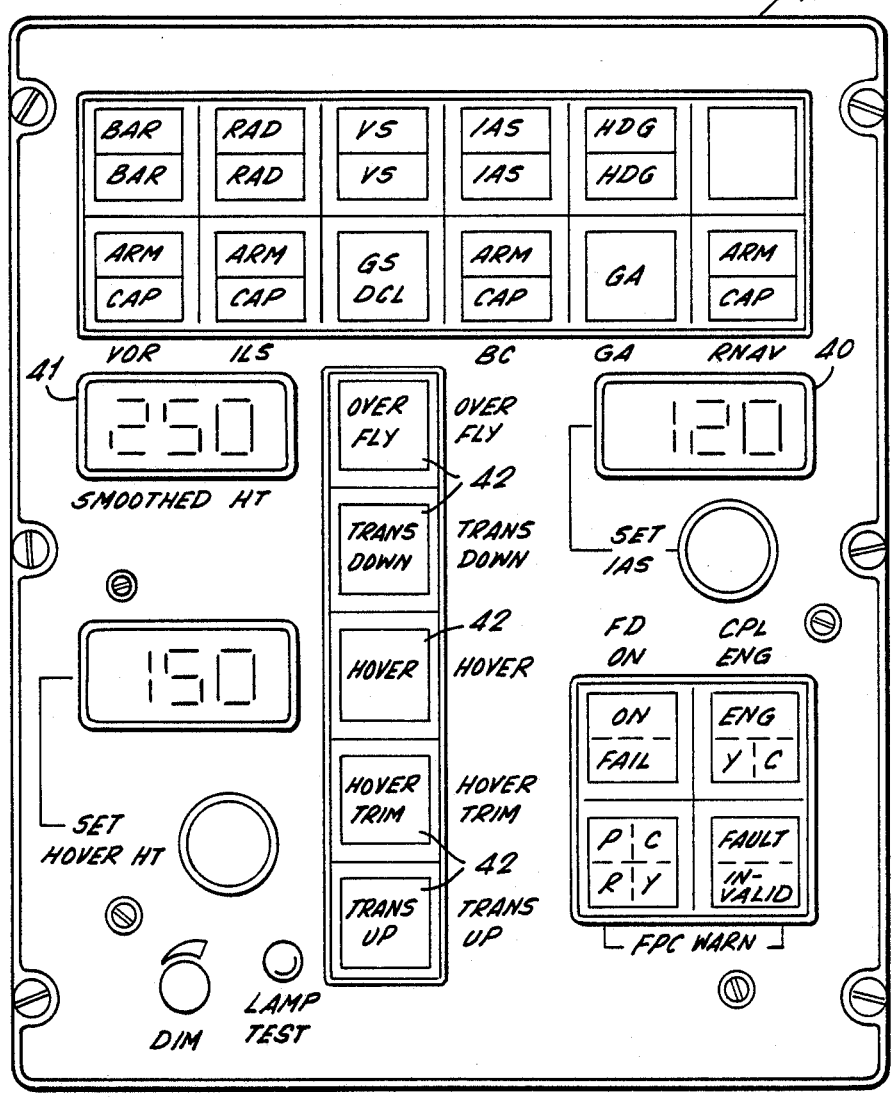
FIG. 4 illustrates a pilot's controller for the equipment of FIG. 3.

Referring now to FIG. 3, at the right hand side of the figure within a dashed line box 10, is a known type of flight controller incorporating a flight path computer 11, a pilot's controller 12, which is shown in further detail in FIG. 4 and two warning panels 13, 14 for the use of the left hand and right hand pilots respectively. These warning panels are shown in further detail in inset FIG. 3a. Each warning panel has a HT LOW indicator 15 which illuminates if the helicopter descends below the programmed height, a "manoeuvring warning" 16 which illuminates 5 seconds before a manoeuvere commences, during the overfly pattern, to give the pilot an indication of the direction of the flight path change and an "FPC WARN" 17 which indicates an FPC fault which may be diagnosed by reference to the controller display 12.

Some of the radar navigational equipment of the helicopter is seen to the left in FIG. 1 in the box 20. This includes a radio navigational computer 21 with an input from a receiver 22. A forward looking search radar 23 has a display screen 24.

Sensors, shown in box 30, include two vertical gyros 31, directional gyros 32, a Doppler sensor 33 a true air speed (TAS) transducer 34 and a radio altimeter 35. The flight controller also incorporates an accelerometer pack 15 to determined longitudinal and lateral accelerations and attitude direction indicators for each pilot. A hovermeter 36 constituting part of the display of the flght controller 10 and makes use of data from the Doppler sensor 33, via the computer 21, to provide ground speed information for the pilot to enable the pilot to hold the helicopter in a hover position.

The pilot's controller 12 is shown in further detail in FIG. 4 and provides displays 40, 41 for airspeed and smoothed height and has a number of function selectors 42 for selecting mode profiles to be described later.

The apparatus described above is integrated with an automatic "heading hold" facility for flying the helicopter automatically to a selected heading. More specifically in a helicopter fitted with an "AFCS" unit, signals from the "Flight Path Computer" 11 are received by the AFCS and used to control the desired heading.

A 'monitored' flying procedure is employed when using the SAR mode of the "Flight Path Computer." The handling pilot retains control of the aircraft and uses the flight director (FD) command information for flight path guidance throughout the 'overfly' pattern and the transition down manoeuvre. The aircraft is flown with rate stabilisation in the pitch and roll channels and the yaw channel selected to heading hold. The monitoring pilot executes check list procedures, maintains the radio watch, and monitors the FD, navigation and system displays.

In another aspect of the present invention automatic control of all aircraft axes (pitch, roll, yaw and collective) is achieved with signals from the "Flight Path Computer" being applied as inputs to the AFCS. In an aircraft fitted with this aspect of the present invention the pilots perform a monitoring function only.

There are a number of SAR mode profiles selectable by the push-button switches 42 on the pilot's controller. One is the "OVERFLY" profile. On flying overhead the survivor's position, the "OVERFLY" button on the controller is pressed (see FIG. 2). This initiates a FD guided "race-track" pattern shown in FIG. 5 which culminates in an automatic entry into a transition down into wind, to the survivor's position. The FPC computer calculates the most expeditious pattern and an indication of any turn or descent is given by illumination of the appropriate arrow on the 'manoeuvre warning'. Pre-transition down checks are carried out on the down-wind leg, including the setting of 'Hover Height' and radio altimeter warning bugs.

Another mode profile is "TRANS DOWN". Preceded by the appropriate manoeuvre warning, the transition down is initiated automatically at the correct computed distance down-wind of the survivors' position (see FIG. 6). It may also be initiated manually at the controller. The nominal entry gate conditions are 200 ft and 80 kt. The transition down profile lasts approximately 90 seconds, and follows a descending and decelrating profile which terminates in a level 'drift forward' at approximately 10 kt ground speed at the preselected hover height, (40–199 ft). If any evidence of a cross-track error is apparent during the transition down (e.g. from the homer or radar) this may be corrected by the winch operator applying left or right inputs through an Auxiliary Manoeuvre Control (AMC) to generate a translational ground speed. This may be necessary if the original overhead position was inaccurate. The transition down may be 'aborted' at any time by pressing TRANS UP, which will give a guided or automatically controlled climb and acceleration to 200 ft and 80 kt.

The transition down culminates in a low speed drift forward at the preselected hover height which is employed to 'creep' towards the survivor in poor visibility. When the survivor is sighted or when required, pressing HOVER on the controller results in a guided or automatically controlled deceleration to hover.

Having established the hover, if insufficient external references are available for visual manoeuvring, then the aircraft may be manoeuvred by the winch operator applying 'demand' inputs to the computer using the AMC which are then displayed for the pilot to follow using the "FD" or are applied directly to the "AFCS" for automatic control. Control is then passed to the AMC by pressing HOVER TRIM on the pilots' controller. The pilots may monitor the longitudinal and lateral ground speeds by reference to the hovermeter. The AMC is fitted with an integral hoist control to allow the winch operator to perform the winching and manoeuvring tasks simultaneously. If sufficient visual reference do become available, the survivor pick-up may be accomplished by the handling point in the usual way.

The hover height may be altered using the appropriate 'SET HOVER HT' knob and display on the pilots' controller at anytime during the 'drift forward' or hover. In moderate sea states a hover height of 40 ft is selected but higher heights may be selected in heavy seas or for the initial approach to large vessels.

On completion of the rescue, a guided or automatically controlled climb out from the hover may be obtained by pressing 'TRANS UP'. This is a gentle manoeuvre rerquiring only a small increase in power, and it culminates in a level-off at 200 ft and 80 kt.

In the event of a fault developing within the system, the design philosophy has been aimed at providing suitable warnings to aid diagnosis, and in the pilot guided aspect of the system it drives only the relevant FD command bar out of view if the information it provides becomes unreliable and in the fully automatic version disconnects the defective axis. The FPC WARN annunciator 17 above each ADI 19 is used to annunciate FAULT, FAIL, INVALID, and axis (P, R, & C) warnings. These will enable the pilot to decide whether to continue the current manoeuvre or 'abort'.

Height monitoring is achieved using a duplicated altimeter system. The following additional safeguards have also been incorporated.

a. The accelerator pack provides a vertical accelerometer input which the FPC computer uses to compare with the radio altimeter signal. Radio altimeter 'runways' will be detected and a warning displayed.

b. Radio altimeter 'bugs' will be set on both indicators to a height just below the selected hover height (−5 ft on the LH side, and −10 ft on the RH side). These are within the instrument scan and have proved to be 'attention-getting'.

c. A HT LOW warning 13 is provided above the ADI on both sides, also within the instrument scan.

d. During the latter part of the transition down, the winch operator will be 'head-out' and external lights will be on. In most situations, he will also provide a height monitoring service.

For a rescue at sea, drift of the survivor has been been taken into account. The FPC includes means for calculating this drift utilising input received from the Doppler sensor and true airspeed transducers. For this purpose use is made of the computed wind information and allowance made for water movement, e.g. the rate and direction of tidal drift. The computed drift may then be used in determining the required flight pattern to bring the helicopter back to the survivor.

What is claimed is:

1. A helicopter having a controlled/navigation system comprising a forward looking electro-magnetic radiation detector, a screen display for providing an image of radiation sources detected thereby, a flight director means having actuating means for operation when the helicopter is positioned overhead of a particular object located by the detector and flight path computer means to provide signals for automatic control or pilot guidance of the helicopter in a predetermined flight pattern to navigate the helicopter through a path extending down-wind of the object and then into wind and at a preselected height and predetermined speed towards the location of the object and then to hover over the object hover mode, further comprising means to monitor the actual flight path of the helicopter and to provide a warning signal to abort the predetermined flight path if the helicopter should move out of the predetermined path.

2. A helicopter as claimed in claim 1 wherein the electro-magnetic radiation detector comprises an infra-red camera and further comprising a display screen for providing an image of objects detected by the camera.

3. A helicopter as claimed in claim 2 wherein means are provided for scanning the infra-red camera transversely across the line of the flight path of the helicopter.

4. A helicopter as claimed in claim 1 wherein the electro-magnetic radiation detector includes a forward looking television camera for viewing from the helicopter to detect an object and a monitor for displaying the image seen by the camera.

5. A helicopter as claimed in claim 1 wherein the electro-magnetic radiation detector includes a radar transmitter/receiver and display screen for viewing images from objects from which the radar signal is reflected back.

6. A helicopter as claimed in claim 1 wherein the electro-magnetic radiation detector includes a radio receiver and means for indicating the bearing of a radio signal received in relation to the heading of the helicopter to enable the helicopter to home towards the signal.

7. A helicopter as claimed in claim 1 and having manually operable means for providing an indication of the position of the helicopter overhead an object detected by said detecting means.

8. A helicopter as claimed in claim 1 wherein the flight path computer means controls a visual display for the guidance control signal for observance by the helicopter flight crew.

9. A helicopter as claimed in claim 1 wherein the helicopter further comprises an automatic flight control system and the flight path computer means is coupled to the automatic flight control system whereby the guidance control signals produced by the flight path computer means are supplied to the flith control system for automatic control of the helicopter.

10. A helicopter as claimed in claim 1 further comprising a radio navigational system and a computer integrating sensor input for determining the position of the helicopter and for providing such positional information for use by the flight path computer means.

11. A helicopter as claimed in claim 10 wherein said computer provides signals indicating the required flight pattern of the helicopter for flying in a predetermined search pattern from a search start-point.

12. A helicopter as claimed in claim 11 further comprising a forward looking search radar and a radar display screen for displaying a radar pattern, signals indicating the required path for the search patterns being applied to the radar display screen to show the signal search path superimposed on the radar pattern displayed on the radar display screen.

13. A helicopter as claimed in claim 1 and further including a Doppler radar for determining longitudinal and lateral ground speed and providing control signals for pilot-control of the helicopter on said predetermined flight path and in the hover mode of the helicopter.

14. A helicopter as claimed in claim 13 and including an auxiliary maneuver control system which, in conjunction with inputs from the Doppler radar, enables command signals to be provided for the pilot for precision pilot control of the helicopter on said predetermined flight path and in the hover mode.

15. a helicopter as claimed in claim 14 wherein the helicopter is provided with an automatic flight control system wherein the auxiliary maneuver control system is coupled to the automatic flight control system whereby automatic control of the helicopter on said predetermined flight path and in the hover mode are provided.

16. A helicopter as claimed in claim 15 wherein the auxiliary maneuver control system includes means to modify an automatically controlled downward transition of the helicopter in the predetermined flight path and in the hover mode to modify the signals from the flight path computer to the automatic flight control system of the helicopter.

17. A helicopter as claimed in claim 1 wherein the flight path computer means includes means for calculating the drift of a survivor in the sea and means for computing and displaying said predetermined flight pattern in accordance with the calculated drift.

18. A helicopter as claimed in claim 1 wherein the controlled/navigation system is disposed in the helicopter so as to enable the crew of the helicopter to locate and safely approach to land the helicopter at a location off-shore.

19. A helicopter as claimed in claim 1 wherein the controlled/navigation system is disposed so as to enable the crew of the helicopter to search for, locate and accurately approach a pipeline for further investigation or marking of a pipeline defect or to search for and locate overhead electrical power line defects.

20. A helicopter as claimed in claim 1 wherein the controlled/navigation system is disposed so as to assist the crew of the helicopter to search for, locate and safely approach to land the helicopter at landing sites or locations not previously surveyed.

21. A helicopter as claimed in claim 1 wherein the controlled/navigation is disposed so as to assist the crew of the helicopter to search for, locate and if required, safely approach any object detectable by the electro-magnetic radiation detector where such search, location or approach might otherwise be rendered impossible or hazardous because of prevailing meterological/geographical/obstruction conditions and/or darkness.

22. A method of searching over water by helicopter for an object in the water comprising the steps of flying a helicopter along a controlled search path while scanning the surface of the water for a source/reflector of electro-magnetic radiation indicating the object sought, over-flying any object so detected, operating a flight path computer at the point of overflying the object detected to provide control signals for manual or automatic guidance of the helicopter into a predetermined flight pattern to bring the helicopter down-wind of and then into-wind at a predetermined height and speed towards the location of the object, and then to hover over the object in a hover mode, and further comprising the steps of monitoring the actual flight path of the helicopter and providing a warning signal to abort the predetermined flight path if the helicopter should move out of the predetermined path.

23. A method as claimed in claim 22 wherein the helicopter is flown over a predetermined search path in accordance with signals provided by a radio navigational system which provides information for use by the flight path computer to indicate a flight pattern for the helicopter over the required field of search while the sea is scanned to trace the object being searched for.

24. A method as claimed in claim 22 wherein the search path is scanned by an infra-red camera, a television camera and/or radar and the resulting signals are displayed on at least one monitor.

25. A method as claimed in claim 22 wherein a helicopter is held in said hover mode over the object using Doppler control responsive to surface conditions.

26. A method as claimed in claim 22 wherein the electromagnetic radiation is thermal radiation.

* * * * *